United States Patent [19]
Curtis et al.

[11] 3,831,046
[45] Aug. 20, 1974

[54] SEALING DEVICE FOR DISCHARGE CHAMBER OF LIQUID COOLED ROTORS FOR DYNAMOELECTRIC APPARATUS

[75] Inventors: Little P. Curtis; Sui C. Ying, both of Monroeville; George F. Dailey, Pittsburgh, all of Pa.

[73] Assignee: Westinghouse Electric Corporation, Pittsburgh, Pa.

[22] Filed: Aug. 16, 1973

[21] Appl. No.: 389,046

[52] U.S. Cl.................................... 310/54, 310/61
[51] Int. Cl. ............................................ H02k 9/00
[58] Field of Search ............ 310/54, 57, 58, 59, 60, 310/61, 64

[56]         References Cited
        UNITED STATES PATENTS
3,359,438  12/1967  Hylen.................................. 310/59
3,543,062  11/1970  Banchieri............................ 310/59
3,689,786   9/1972  Hunt................................... 310/58

3,742,266   9/1971  Heller................................. 310/54

Primary Examiner—R. Skudy
Attorney, Agent, or Firm—G. H. Telfer

[57]  ABSTRACT

A gland seal for the discharge passages of a liquid cooled rotor for a dynamoelectric apparatus. Coolant liquid is discharged into a stationary coolant collection chamber surrounding the rotor. The stationary coolant discharge chamber has a gaseous fluid therein. A gland seal ring encircles the rotor adjacent the discharge chamber and a first sealing liquid having a predetermined pressure is introduced into a clearance disposed between the seal ring and the rotor. A second sealing liquid having a pressure not exceeding the pressure of the first sealing liquid is introduced into the clearance between the seal ring and the rotor. The first sealing liquid minimizes leakage of the coolant liquid from the discharge chamber, and also prevents contamination of the coolant liquid by the second sealing liquid.

12 Claims, 2 Drawing Figures

SEALING DEVICE FOR DISCHARGE CHAMBER OF LIQUID COOLED ROTORS FOR DYNAMOELECTRIC APPARATUS

BACKGROUND OF THE INVENTION

1. Field of the Invention:

The present invention relates to liquid cooled rotors for dynamoelectric machines of large sizes, such as turbine generators, and more particularly to a gland seal for the passages through which the coolant liquid is discharged from the rotor.

2. Description of the Prior Art:

Large turbine generators are usually of the inner cooled or direct cooled construction in which a coolant fluid is circulated through duct means in the stator and rotor slots in direct thermal contact with the current carrying conductors inside the ground insulation. This type of construction provides a very effective cooling system and has made it possible to greatly increase the maximum ratings obtainable in large generators without exceeding the permissible limits of physical size. The coolant used in these machines has usually been hydrogen, which fills the gas tight housing and is circulated by a blower on the rotor shaft through the ducts of the stator and rotor windings and through ducts in the stator core.

The maximum ratings required in large generators have continued to increase, making it necessary to further improve the cooling of these machines in the largest sizes. A substantial improvement in cooling can be obtained by the use of more efficient coolant fluids, such as liquids. This has been done in stators by circulating a liquid coolant, such as water, through the ducts of the stator winding, and a considerable improvement in cooling has thus been obtained. A substantial further improvement can be obtained by applying liquid cooling to the rotor by circulation of a suitable liquid, such as water, through passages in the rotor windings.

Many problems are involved, however, in circulating a liquid coolant through the passages in the rotor of a large generator rotating at a high speed, usually 3,600 rpms. One of the most difficult problems is that of introducing the liquid into the rotor and discharging it therefrom. The liquid is preferably introduced along the axis of the shaft where the centrifugal force on the liquid is at a minimum, and is discharged through radial passages in the rotor shaft. A relatively large volume of liquid must be introduced into the rotor under sufficient pressure to maintain the desired flow rate through the rotor, and the same liquid is discharged from the rotor at high velocity and under high pressure into a stationary coolant discharge chamber from which it is drained. A copending application of L. P. Curtis, et al. Ser. No. 144,050, filed May 17, 1971, now U.S. Pat. No. 3,733,502 and assigned to the assignee of the present invention, discloses a novel method of fabricating a liquid cooled rotor for a large dynamoelectric apparatus.

In a liquid cooled rotor, suitable seals must be provided at both the entrance and discharge openings or passages, but the provision of such seals provides a difficult problem because of the high velocity of the liquid and pressures involved.

The known types of seals for rotating shafts all have serious disadvantages when applied to a large dynamoelectric apparatus shaft. Labyrinth seals are well known in the art, but such seals are not effective for coolant liquids such as water, because of the large clearances required between the seal housing and the rotating shaft. Also, labyrinth seals are ineffective with liquids having a low viscosity, such as water, which results in excessive leakage through the seal.

Friction or face type seals are also well known in the art. These seals however, are impractical for large, liquid cooled turbine generator rotors because of the very high rubbing velocities, which may be in excess of 20,000 feet per minute. Such velocities result in very rapid wear with excessive heating and friction loss.

Fluid film gland seals using stationary seal rings are more suitable for the difficult conditions of service here considered. In such seals, a pressurized sealing liquid together with a minimal amount of specially treated and slightly more-pressurized coolant liquid passes from the discharge chamber through a small clearance between a seal ring and the shaft and escapes into a chamber adjacent the sealing ring which is maintained at atmospheric pressure and which is sealed to prevent the escape of the liquid along the shaft. An adjacent chamber containing air at a pressure above atmosphere is provided to prevent the liquid from escaping from the atmospheric chamber. In this way a very effective seal is provided for large volume of liquid at high velocity and pressures. The copending application of P. R. Heller et al., Ser. No. 181,479, filed Sept. 17. 1971 now U.S. Pat. No. 3,733,501 and assigned to the assignee of the present invention, discloses an example of the prior art utilizing a radial type single flow fluid gland seal.

However, empirical testing has indicated that for a water filled pressurized discharge chamber, as utilized in the last mentioned patent, the friction drag loss on a 21 inch diameter test shaft is approximately 280 KW over 8 inches of continuous water contact. In addition, running the seal test model with a pressurized discharge chamber also results in cavitation at the intersection of the rotor surface and the restrictor opening for all speeds above approximately 10,000 ft. per minute.

As the discharge chamber pressure is increased, it was found that cavitation is attenuated only slightly. As is well known to those skilled in the art, cavitation is the formation and violent collapse of bubbles within a liquid, and occurs when the local static pressure drops below the vapor pressure of the liquid.

Since cavitation occurs adjacent to a rotor surface, that surface may erode and pitting may occur. The abrupt collapse of the bubbles formed by cavitation also causes noise and unnecessary vibration which deleteriously affect performance and efficiency of the apparatus.

Both the problems of cavitation and loss of efficiency can be overcome by the utilization of a partially filled coolant discharge chamber. Without a solid body of water around the rotor surface, as was the case in the prior art, the drag loss measured has been found to be insignificant. It is obvious that elimination of this drag loss will increase the efficiency of the apparatus. Since the coolant discharge chamber has a gaseous fluid disposed therein, the coolant discharge chamber cannot completely fill with coolant liquid, thus cavitation is impossible.

However, the same problems concerning contamination of the coolant liquid as were encountered in the prior art are also present with the partially filled coolant discharge chamber. It is therefore necessary to provide sealing means to avoid contamination of the coolant liquid.

SUMMARY OF THE INVENTION

In this invention, a liquid cooled rotor for a large dynamoelectric apparatus, such as a generator, is provided with effective sealing means at the coolant discharge chamber to prevent the escape of, and contamination of, the coolant liquid. The seal has a stationary coolant discharge chamber disposed around the rotor shaft at a very small clearance between the discharge chamber housing and the rotor shaft. The coolant discharge chamber has disposed therein a gaseous fluid.

The liquid coolant being discharged from the rotor is first introduced into the stationary coolant discharge chamber. A stationary sealing ring encircles the shaft in an annular chamber disposed adjacent the stationary coolant discharge chamber. The seal ring encircles the shaft with a small clearance. In order to minimize leakage of the coolant liquid through the clearance space between the seal ring and the rotor shaft a first sealing liquid is introduced through an opening in the sealing ring the clearance space between the sealing ring and the shaft. The first sealing fluid is maintained at a predetermine pressure and is specially treated before use in the apparatus.

A second sealing liquid is introduced through a separate opening in the sealing ring into the clearance between the sealing ring and the shaft. The second sealing fluid is maintained at a pressure not exceeding the pressure of the first sealing liquid. The first sealing liquid is disposed so as to be interposed between the coolant discharge chamber and the second sealing liquid. A small amount of the first sealing liquid may escape through the clearance space around the shaft and into the coolant discharge chamber, but intermingling of the coolant liquid with the first sealing liquid will not be disadvantageous, since the first sealing liquid is treated in a manner similar to the coolant liquid.

However, since the first sealing liquid is at a slightly higher pressure than the second sealing liquid, a small portion of the first sealing liquid leaks out and comingles with the second sealing liquid. The first sealing liquid also comingles with the coolant liquid in the discharge chamber. Since the first sealing liquid is disposed between the coolant discharge chamber and the second sealing liquid, contamination of the coolant liquid by the second sealing liquid is prevented. The second sealing liquid, together with a small amount of first sealing liquid, escapes into a chamber adjacent the seal ring chamber, the escape chamber being maintained at atmospheric pressure. The second sealing liquid is drained from the chamber. This chamber is sealed to prevent the escape of liquid along the shaft, and an adjacent chamber containing air at a pressure above atmosphere, is provided to prevent second sealing liquid from escaping from the atmospheric chamber.

In this way, a very effective seal is provided which is effective for handling large volumes of liquid coolant at high pressures and velocities. The seal increases the efficiency of the apparatus and prevents cavitation of the rotor.

It is therefore an object of this invention to provide a seal which minimizes leakage of the treated coolant liquid to limit the cost of treatment of the coolant liquid. It is a further object of the invention to provide a seal that eliminates the drag loss occasioned by a completely filled coolant discharge chamber to increase the efficiency of the apparatus.

BRIEF DESCRIPTION OF THE DRAWINGS

The invention will be more fully understood from the following detailed description of an illustrative embodiment taken in connection with the accompanying drawings, in which.

DESCRIPTION OF THE PREFERRED EMBODIMENTS

Figure 1:
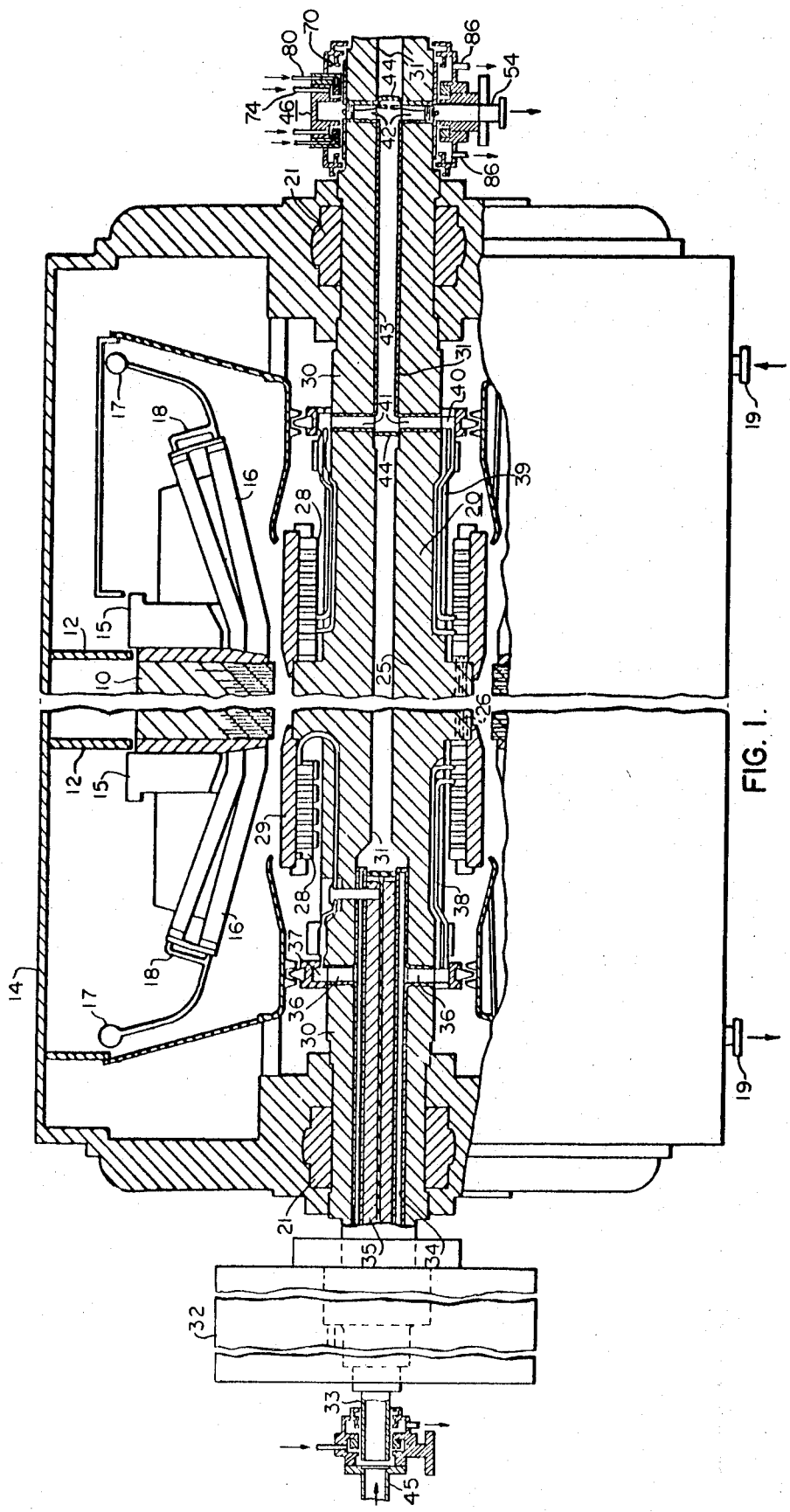
FIG. 1 is a view, in longitudinal section and partly in elevation, of a turbine generator having a liquid cooled rotor which utilizes discharge sealing means embodying the present invention.

Throughout the following description, similar reference characters refer to similar elements in all figures of the drawings.

Referring first to FIG. 1 of the drawings, the invention is shown embodied in a large turbine generator of typical construction, although it will be understood that the sealing means of the present invention is to be used in dynamoelectric apparatus of any desired type.

As shown, the generator has a stator core 10 supported by frame rings 12 in a substantially gas tight outer housing 14. The stator core 10 is of the usual laminated construction having a generally cylindrical bore extending therethrough, the laminations being clamped together between suitable end plates 15 in the usual manner. The stator core 10 has longitudinal slots in its inner periphery for the reception of a stator winding 16 which may be of any suitable type but which is shown as a liquid cooled winding. For this purpose circular inlet and discharge manifold 17 are provided at opposite ends of the apparatus and connected through suitable means, generally indicated at 18, to circulate a coolant such as water through the coils of the stator winding 16. The manifold 17 may be connected as indicated diagrammatically at 19 to an external recirculating system of any desired type. The housing 14 is filled with coolant gas, preferably hydrogen, which is recirculated through the interior of the housing to cool the stator core, and suitable baffling of any desired type may be provided in the housing to direct the flow of gas therein.

The machine has a rotor member 20 which is disposed in the bore of stator core 10 and supported in bearings 21 at the end of the housing 14. The bearing assemblies 21 preferably include gland seals to prevent leakage of gas along the rotor shaft, and may be of any suitable construction. The rotor member 20 has a central body portion 25 which is provided with the usual peripheral slot for the reception of a rotor winding 26. The winding 26, which constitutes the field winding of the generator, may be arranged in any suitable manner in the slots of the rotor to form the desired number of magnetic poles, usually two or four poles in machines of this type. The winding 26 is fabricated of copper conductors which extend longitudinally through the slots of the rotor body 25 and generally circumferentially in the end turn portions 28, which lie beyond the ends of the rotor body 25 and which are supported against rotational forces by retaining rings 29. The conductors of the rotor winding are hollow or have central passages extending through them, for flow of coolant liquid from one end of the winding to the other. Any suitable or desired type of flow pattern and any desired type of electrical circuit may be used.

The rotor 20 as shown in the drawings is a liquid cooled rotor of the construction more fully disclosed and claimed in a copending application of L. P. Curtis et al., Ser. No. 144,050, filed May 17, 1971, now U.S. Pat. No. 3,733,502 and assigned to the assignee of the present invention. The rotor 20 has a shaft portion 30 extending axially from each end of the body portion 25 and preferably integral therewith. A central axial bore 31 extends for the entire length of the rotor from one end to the other. An exciter 32 is provided for supplying field excitation to the windings 26. The exciter 32 may be of any desired type and has a shaft connected to the shaft 30 of the rotor 20 to be driven therewith. As more fully described in the last-mentioned patent, the coolant liquid is preferably water and is introduced through the shaft of the exciter 32 into the shaft portion 30 at the left end of the rotor, as seen in FIG. 1. For this purpose the exciter shaft includes a central tube or pipe 33, preferably of stainless steel or other corrosion resistant material, which is coaxial with the rotor shaft and which extends outwardly from the exciter shaft, as shown in the drawing, for introduction of water.

The water flows from the tube 33 along the axis of the exciter shaft and is directed into an annular passage 34 in the bore 31 of the rotor 20. The passage 34 is preferably formed by two concentric stainless steel tubes which surround axial electrical leads 35 which provide electrical connections from exciter 32 to the rotor winding 26. The water flows through the passages 34 to opposed radial passages 36 which extend to an annular distribution chamber 37 on the surface of the rotor shaft 30. Water is conducted from the annular passage 37 by means of hydraulic connectors 38 of any suitable type connected to the individual conductors of the rotor winding, the connections being made to the end turns 28. The water flows through hollow conductors of the rotor winding to the other end and is discharged through similar hydraulic connectors 39 to an annular collection chamber 40 on the shaft 30 at the right-hand end of the rotor. The liquid flows from the chamber 40 through two opposed radial passages 41 to the bore 31 of the shaft 30, and axially through the bore 31 to opposed radial passages 42 which extend to the surface of the rotor shaft 30.

All the passages and surfaces exposed to the liquid are preferably lined or covered with stainless steel or other corrosion resistant material to prevent corrosion of the rotor steel by the coolant water. In particular, the bore 31 at the right hand of the rotor 20 is lined with a tubular stainless steel liner 43 extending between the two sets of radial passages 41 and 42 and the ends of the liner 43 are closed by suitable closure partitions 44 to close this section of the bore 31 and to confine the coolant liquid thereto.

The coolant water is thus introduced into the rotor 20 through the rotating tube 33 which is on the axis of the exciter shaft 32, and is discharged from the rotor through a radial passage 42. As previously explained, it is necessary to provide very effective seals at both the entrance and the discharge points to prevent the escape of the coolant water which flows through the rotor in relatively large volumes and at high velocity and pressure.

At the entrance end, as seen at the left hand portion of FIG. 1, water is supplied through a stationary pipe and conduit 45. Sealing of the entrance end is provided effectively by a single radial fluid gland seal as disclosed and claimed in the copending application of P. R. Heller et al., Ser. No. 181,479, filed Sept. 17, 1971, now U.S. Pat. No. 3,733,501 and assigned to the assignee of the present invention.

Figure 2:
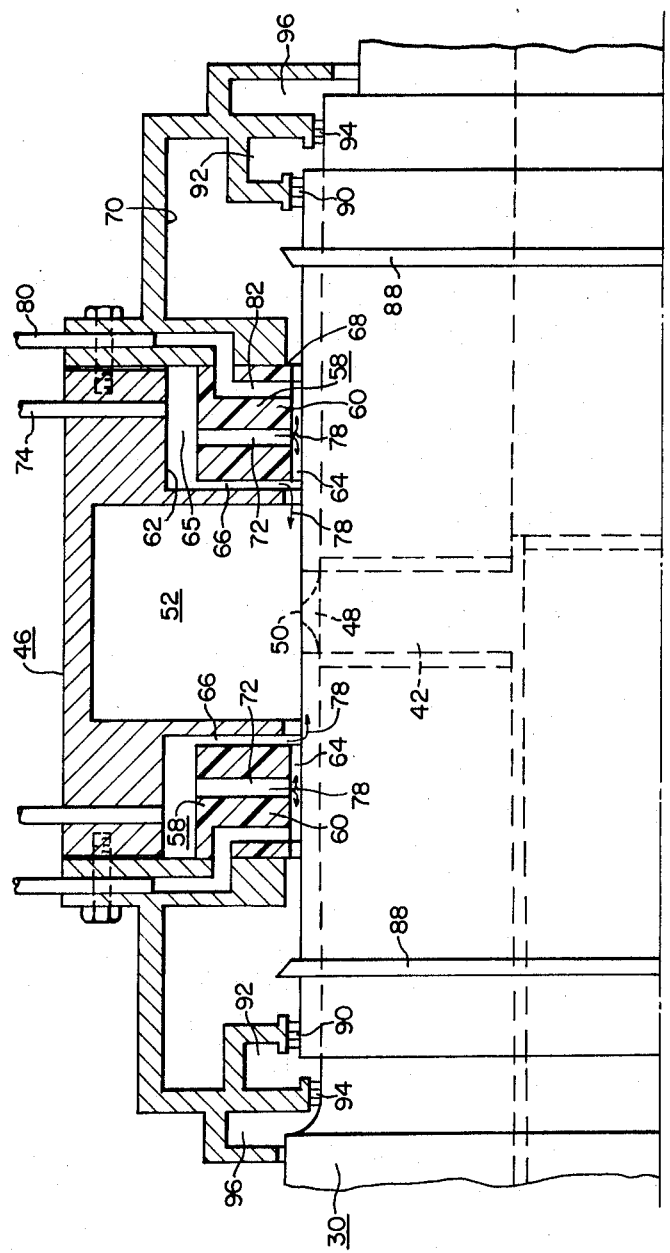
FIG. 2 is a partial longitudinal sectional view on a larger scale of the sealing means of the discharge passage of the rotor.

At the discharge end of the rotor, as shown in FIG. 2, the coolant water which is passed through the rotor is discharged through the opposed radial passages 42 into a stationary discharge housing 46 which encircles the shaft 30 at close clearance and encloses the radial passages 42. As explained more fully in another copending application of L. P. Curtis et al., Ser. No. 182,368 filed Sept. 21, 1971, now U.S. Pat. No. 3,740,596 and assigned to the assignee of this invention, each of the radial passages 42 preferably has a closure plug 48 at its outer end with a suitable restricting orifice 50 therethrough to control the flow of water discharged from the rotor 20. The coolant water thus discharged flows into a stationary coolant chamber 52 which surrounds the shaft 30. The coolant water in this chamber 52 is drained therefrom through a suitable drain pipe 54 (FIG. 1). The coolant liquid discharged in this way is preferably cooled and treated as previously described, and recirculated to the entrance supply pipe 45, where it is again circulated through the apparatus.

As was mentioned previously, the prior maintained the coolant discharge chamber 52 entirely filled with water in order to avoid cavitation effects. However, a pressurized liquid-filled discharge chamber has the deleterious effect of decreasing the efficiency of the rotor 20. Instead of filling the discharge chamber 52 completely with the primary coolant liquid, a volume of gaseous fluid is disposed on the interior of the primary discharge chamber 52. Immediately adjacent to both sides of the primary discharge chamber 52 is a double fluid flow gland seal 58 which provides a fluid film seal to prevent escape of the coolant water from the coolant discharge chamber 52. In the embodiment shown in FIG. 2, the double fluid film gland seal 58 is disposed on both sides of the coolant discharge chamber 52. Only one side of the seal 58 is described, as the opposite side of the seal 58 is identical in construction.

The seal 58 is of the radial gland seal type, and has a double fluid flow, to be described more fully herein, and includes a seal ring 60, contained in each annular chamber 62 which surrounds the shaft 30. The seal ring 60 encircles the shaft with a small radial clearance 64, which may be on the order of a few mils, and fits snugly into the chamber 62 with the smallest clearance 66 as possible to minimize leakage past the ring 60 in the radial direction. The seal ring 60 is stationary in the chamber 62 and may be held against rotation in any desired manner. An annular chamber 65 is disposed above the seal ring 60 and the interior of the body member 46.

As indicated at reference numeral 68 the seal ring 60 extends a few mils closer to the surface of the rotor shaft 30 than does the primary discharge chamber housing 46. This is in order to minimize possible damage due to inherent and uncontrollable vibrations in the rotor shaft 30. The gland seal rings 60 are free floating within the housing 46, allowing the seal ring 60 to move radially with the shaft vibration.

Another annular chamber 70 surrounds the shaft 30 adjacent the annular seal chamber 62 and this lastmentioned chamber 70 is maintained at atmospheric pressure in any suitable manner.

It is apparent that since the liquid that is discharged into the primary coolant discharge chamber 52 is at a relatively high pressure, the pressure drop between the coolant discharge chamber 52 and the first atmospheric chamber is high. Thus, leakage of the coolant water from the coolant discharge chamber 52 through the clearance 64 between the sealing ring 60 and the shaft 30 into the first atmospheric chamber 70 will be quite large. This is undesirable because the coolant water is treated to maintain a high level of purity and remove dissolved oxygen and recirculated after discharge from the rotor 20. The loss of a substantial amount of this liquid is therefore disadvantageous as it would require increased capacity of treating and pumping equipment to supply the necessary large amounts of treated makeup water.

In order to minimize the leakage of the coolant water through the seal ring clearance 64, the seal ring 60 has a plurality of first radial openings 72 extending therethrough. A supply of first sealing liquid is provided through a pipe 74 into the annular chamber 65. The first sealing liquid is a liquid treated in the manner similar to the treatment of the primary coolant liquid. The first sealing liquid is introduced into the annular chamber 65 within the seal chamber 62 and flows through the first radial openings 72 in the gland seal ring 60 to the clearance space 64 disposed between the gland ring 60 and the shaft 30. The first sealing liquid is maintained at a predetermined pressure, and it is thus apparent that a flow of the first sealing liquid will be set up and travel in the directions indicated by arrows 78 in the clearance space 64. Thus it is seen, that the first sealing liquid and some of the coolant liquid contained in the gas filled primary discharge chamber 52 will intermingle, but this is not vital to the efficiency of the machine, because the first sealing liquid and the treated primary liquid are of the same nature.

A second pipe 80 introduces a second sealing liquid into the ring 60 through a second substantially radial passage 82 in the gland seal ring 60. This secondary sealing liquid, typically water, is maintained at a pressure slightly lower than the pressure of the first sealing liquid.

It is apparent that if the pressure of the second sealing liquid supplied through the second pipe means 80 and the second opening 82 in the gland seal 60 into the clearance chamber 65 was exactly equal to the pressure of the first sealing liquid, there would be not leakage of the first sealing liquid into the second sealing liquid. Suitable pressure regulating means are provided (not shown) to maintain a small pressure difference such that the pressure of the secondary sealing liquid is less than the pressure of the first sealing liquid by a small predetermined amount, such as 0.25 psi, or in any event does not exceed the pressure of the first sealing liquid. Thus, any leakage involved is of the first sealing liquid into the second sealing liquid and the first sealing liquid prevents contamination of the primary cooling liquid by the second, untreated, sealing liquid. Since the pressure of the second sealing liquid is only slightly less than that of the first sealing liquid, the amount of the first sealing liquid which can escape through the clearance 64 under the seal ring 60 is extremely limited and the total leakage of the entire seal is effectively minimized.

As was noted previously the prior art provided a pressurized water filled discharge chamber, however due to fluid friction, the drag loss initiated by the water filled discharge chamber severely limited the efficiency of the rotor. It is apparent that by disposing in the primary discharge chamber 52 a gaseous fluid that this drag loss is eliminated. The efficiency of the machine is thereby increased, thus providing a definite advantage to this improved seal means over the prior art. In addition, cavitation in the primary discharge chamber 52 is eliminated, since the primary discharge chamber 52 is not completely filled with coolant water.

The secondary sealing liquid, with a small amount of primary sealing liquid, escapes through the seal ring clearance 64 into the first chamber 70, which is maintained at atmospheric pressure, and the secondary sealing fluid is drained from each of the first stationary chambers 70 through a drain pipe 86 (FIG. 1). A first stationary chamber 70 is provided adjacent each of the annular seal ring chambers 62.

A thrower 88 is preferably provided on the shaft 30 within the first stationary chamber 70 to remove any water flowing on the shaft 30.

A labyrinth seal 90 is preferably provided between the outer walls of the first stationary chambers 70 and the shaft 30 to seal the first stationary chambers 70. Since some of the water will tend to follow the shaft 30 and get past the thrower 88, there is a tendency for some leakage through the labyrinth seals 90.

In order to prevent this, another set of annular chambers 92 is provided on the outside of each of the first stationary chambers 70, with a second labyrinth seal 94 disposed between the outer walls of the second stationary chambers 92 and the shaft 30. The second stationary chambers 92 are maintained at a pressure somewhat above atmospheric. This second set of pressurized chambers 92 prevents leakage of water through the first labyrinth seals 90.

A final annular chamber 96 encircles the shaft 30 adjacent the set of second annular chambers 92 to protect the second labyrinth seal 94 and to maintain the pressurization of the second annular chamber 92.

It is apparent that sealing means have thus been provided which are very effective for containing, with minimum leakage, the large volume of high pressure coolant water circulated through the rotor 20 of a large generator. The coolant liquid is discharged into a chamber 52 encircling the rotating shaft 30. The discharge chamber 52 has disposed therein a gaseous fluid which prevents the discharge chamber 52 from becoming completely filled with pressurized coolant liquid. A pair of gland seal rings 60 encircle the shaft 30 on each adjacent side of the primary discharge chamber 52, but such sealing rings 60 alone would not prevent excessive leakage because of the high pressure drop across the clearance 64 between the rings 60 and the shaft 30.

In order to minimize this leakage, a first sealing liquid is introduced by suitable means 74 into the annular chamber 65 above the gland seal rings 60 and passes through a first radial passage 72 in the gland seal ring 60 into the clearance space 64. The first sealing liquid is a treated liquid maintained at a predetermined pressure and flows both away from and into the primary discharge chamber 52. In order to prevent the treated first sealing liquid from flowing from the primary discharge chamber 52 toward the first stationary chamber 70 due to the high pressure drop in the clearance space 64, second means 80 for introducing a secondary sealing fluid are disposed in the primary discharge chamber body 46. The secondary sealing fluid passes through a second substantially radial passage 82 in the gland seal ring 60; the secondary sealing liquid being isolated from the first seal water by the body of the gland seal itself, the secondary sealing water being introduced in the clearance space 64 between the gland seal ring 60 and the shaft 30. The primary seal water is thus disposed between the primary discharge chamber 52 and the secondary sealing water. Secondary sealing water is maintained at a pressure less than the pressure of the primary sealing water. Thus, leakage if is to occur, it will occur from the first sealing liquid into the secondary sealing liquid. The leakage of the coolant is minimized, and a first stationary chamber 70 is disposed so as to collect and to drain the secondary sealing liquid which is forced thereinto.

In addition, elimination of the water-filled primary discharge chamber eliminates the drag loss attendant upon the filled discharge chamber. The chamber need no longer be filled with liquid coolant to provide an effective seal arrangement, thus the efficiency of the apparatus is appreciably increased.

We claim as our invention:

1. A rotor for a dynamoelectric machine comprising:

a body portion having windings thereon, said windings having openings for circulation of a liquid coolant therethrough;
a shaft portion extending from said body portion, said shaft having passages for circulation of said liquid coolant through said shaft, said passages in said shaft including a discharge passage for discharging said liquid coolant therefrom;
sealing means associated with said discharge passage, said sealing means comprising a stationary body member, said body member having a close clearance with said shaft, said body member having a first and a second axial side thereon, a liquid coolant discharge chamber disposed within said body member, said liquid coolant discharge chamber having a gaseous fluid therein;
a first stationary seal ring encircling said shaft with a small clearance space adjacent said first axial side of said body member, said clearance space communicating with said liquid coolant discharge chamber;
first conduit means for introducing a first sealing liquid into said clearance space between said first seal ring and said shaft, said first sealing liquid being maintained at a predetermined pressure;
second conduit means for introducing a second sealing liquid into said clearance space between said first seal ring and said shaft, said second sealing liquid being maintained at a pressure not exceeding the pressure of said first sealing liquid, said first sealing liquid being disposed in said clearance space between said first seal ring and said shaft intermediate said liquid coolant discharge chamber and said second sealing liquid;
a first stationary chamber surrounding said shaft adjacent said first seal ring, said first stationary chamber communicating with said clearance space between said first seal ring and said shaft, said first stationary chamber receiving said first and said second sealing liquids expelled from said clearance space between said first seal ring and said shaft, said first stationary chamber being maintained at a predetermined pressure;
first labyrinth seal means for sealing said first stationary chamber; and,
means for draining said first stationary chamber.

2. The rotor of claim 1, further comprising a second stationary chamber surrounding said shaft adjacent said first stationary chamber, said second stationary chamber being maintained at a pressure greater than the pressure maintained in said first stationary chamber.

3. The rotor of claim 2, wherein
said first seal ring is contained in a first annular chamber adjacent said liquid coolant discharge chamber, the radially outermost surface of said first seal ring defining an annular space within said first annular chamber, said first seal ring having a first opening extending therethrough, said first sealing liquid being introduced into said annular space by said first conduit means, said first sealing liquid passing through said first opening in said first seal ring into said clearance space between said first seal ring and said shaft; and,
said first seal ring having a second opening extending therethrough, said second sealing liquid being introduced directly into said second opening in said first seal ring by said second conduit means, said second sealing liquid passing through said second opening in said first seal ring into said clearance space between said first seal ring and said shaft.

4. The rotor of claim 3, further comprising:
a second stationary seal ring encircling said shaft with a small clearance space adjacent said second axial side of said body member, said clearance space communicating with said liquid coolant discharge chamber;
third conduit means for introducing said first sealing liquid into said clearance space between said second seal ring and said shaft;
fourth conduit means for introducing said second sealing liquid into said clearance space between said second seal ring and said shaft, said first sealing liquid being disposed in said clearance space between said second seal ring and said shaft intermediate between said liquid coolant discharge chamber and said second sealing liquid;
a third stationary chamber surrounding said shaft adjacent said second seal ring, said third stationary chamber communicating with said clearance space between said second seal ring and said shaft, said third stationary chamber receiving said first and said second sealing liquids expelled from said clearance between said second seal ring and said shaft, said third stationary chamber being maintained at a predetermined pressure;
second labyrinth seal means for sealing said third stationary chamber; and,
means for draining said third stationary chamber.

5. The rotor of claim 4, further comprising a fourth stationary chamber surrounding said shaft adjacent said third stationary chamber, said fourth stationary chamber being maintained at a pressure greater than the pressure maintained in said third stationary chamber.

6. The rotor of claim 5, wherein
said second seal ring is contained in a second annular chamber adjacent said liquid coolant discharge chamber, the radially outermost surface of said second seal ring defining an annular space within said second annular chamber, said second seal ring having a first opening extending therethrough, said first sealing liquid being introduced into said annular space by said third conduit means, said first sealing liquid passing through said first opening in said second seal ring into said clearance space between said second seal ring and said shaft; and,
said second seal ring having a second opening extending therethrough, said second sealing liquid being introduced directly into said second opening in said second seal ring by said fourth conduit means, said second sealing liquid passing through said second opening in said second seal ring into said clearance space between said second seal ring and said shaft.

7. A shaft seal for preventing escape of a liquid along a rotating shaft, said seal comprising:
a stationary body member, said body member having a close clearance with said shaft, said body member having a first and a second axial side thereon, a liquid discharge chamber disposed within said body member, said liquid discharge chamber having a gaseous fluid therein;
a first stationary seal ring encircling said shaft with a small clearance space adjacent said first axial side of said body member, said clearance space communicating with said liquid discharge chamber;
first conduit means for introducing a first sealing liquid into said clearance space between said first seal ring and said shaft, said first sealing liquid being maintained at a predetermined pressure;
second conduit means for introducing a second sealing liquid into said clearance space between said first seal ring and said shaft, said second sealing liquid being maintained at a pressure not exceeding the pressure of said first sealing liquid, said first sealing liquid being disposed in said clearance space between said first seal ring and said shaft intermediate said liquid discharge chamber and said second sealing liquid;
a first stationary chamber surrounding said shaft adjacent said first seal ring, said first stationary chamber communicating with said clearance space between said first seal ring and said shaft, said first stationary chamber receiving said first and said second sealing liquids expelled from said clearance space between said first seal ring and said shaft, said first stationary chamber being maintained at a predetermined pressure;
first labyrinth seal means for sealing said first stationary chamber; and,
means for draining said first stationary chamber.

8. The seal of claim 7, further comprising a second stationary chamber surrounding said shaft adjacent said first stationary chamber, said second stationary chamber being maintained at a pressure greater than the pressure maintained in said first stationary chamber.

9. The seal of claim 8, wherein
said first seal ring is contained in a first annular chamber adjacent said liquid discharge chamber, the radially outermost surface of said first seal ring defining an annular space within said first annular chamber, said first seal ring having a first opening extending therethrough, said first sealing liquid being introduced into said annular space by said first conduit means, said first sealing liquid passing through said first opening in said first seal ring into said clearance space between said first seal ring and said shaft; and,
said first seal ring having a second opening extending therethrough, said second sealing liquid being introduced directly into said second opening in said first seal ring by said second conduit means, said second sealing liquid passing through said second opening in said first seal ring into said clearance space between said first seal ring and said shaft.

10. The seal of claim 9, further comprising:
a second stationary seal ring encircling said shaft with a small clearance space adjacent said second axial side of said body member, said clearance space communicating with said liquid discharge chamber;
third conduit means for introducing said first sealing liquid into said clearance space between said second seal ring and said shaft;
fourth conduit means for introducing said second sealing liquid into said clearance space between said second seal ring and said shaft, said first sealing liquid being disposed in said clearance space between said second seal ring and said shaft intermediate said liquid discharge chamber and said second sealing liquid;
a third stationary chamber surrounding said shaft adjacent said second seal ring, said third stationary chamber communicating with said clearance space between said second seal ring and said shaft, said third stationary chamber receiving said first and said second sealing liquids expelled from said clearance between said second seal ring and said shaft, said third stationary chamber being maintained at a predetermined pressure;
second labyrinth seal means for sealing said third stationary chamber; and,
means for draining said third stationary chamber.

11. The seal of claim 10, further comprising a fourth stationary chamber surrounding said shaft adjacent said third stationary chamber, said fourth stationary chamber being maintained at a pressure greater than the pressure maintained in said third stationary chamber.

12. The seal of claim 11, wherein
said second seal ring is contained in a second annular chamber adjacent said liquid discharge chamber, the radially outermost surface of said second seal ring defining an annular space within said second annular chamber, said second seal ring having a first opening extending therethrough, said first sealing liquid being introduced into said annular space by said third conduit means, said first sealing liquid passing through said first opening in said second seal ring into said clearance space between said second seal ring and said shaft; and,
said second seal ring having a second opening extending therethrough, said second sealing liquid being introduced directly into said second opening in said second seal ring by said fourth conduit means, said second sealing liquid passing through said second opening in said second seal ring into said clearance space between said second seal ring and said shaft.

* * * * *